United States Patent
Lake et al.

(10) Patent No.: US 11,808,941 B2
(45) Date of Patent: Nov. 7, 2023

(54) AUGMENTED IMAGE GENERATION USING VIRTUAL CONTENT FROM WEARABLE HEADS UP DISPLAY

(71) Applicant: GOOGLE LLC, Mountain View, CA (US)

(72) Inventors: Stephen Lake, Kitchener (CA); Samuel Legge, Kitchener (CA); Lee Payne, Waterloo (CA); Lahiru Maramba Kodippilige, Mississauga (CA); Eric A. Patterson, Waterloo (CA)

(73) Assignee: GOOGLE LLC, Mountain View, CA (US)

( * ) Notice: Subject to any disclaimer, the term of this patent is extended or adjusted under 35 U.S.C. 154(b) by 366 days.

(21) Appl. No.: 16/700,255

(22) Filed: Dec. 2, 2019

(65) Prior Publication Data

US 2020/0175768 A1    Jun. 4, 2020

Related U.S. Application Data

(60) Provisional application No. 62/773,851, filed on Nov. 30, 2018.

(51) Int. Cl.
| | |
|---|---|
| *G02B 27/01* | (2006.01) |
| *G06T 19/00* | (2011.01) |
| *G06F 3/01* | (2006.01) |
| *G06F 3/04815* | (2022.01) |
| *G06V 20/20* | (2022.01) |
| *G06V 10/764* | (2022.01) |
| *G06V 10/82* | (2022.01) |

(52) U.S. Cl.
CPC .......... *G02B 27/017* (2013.01); *G06F 3/011* (2013.01); *G06F 3/017* (2013.01); *G06F 3/04815* (2013.01); *G06T 19/006* (2013.01); *G06V 10/764* (2022.01); *G06V 10/82* (2022.01); *G06V 20/20* (2022.01); *G02B 2027/0141* (2013.01); *G02B 2027/0178* (2013.01)

(58) Field of Classification Search
None
See application file for complete search history.

(56) References Cited

U.S. PATENT DOCUMENTS

| | | | | |
|---|---|---|---|---|
| 2010/0061603 | A1* | 3/2010 | Mielekamp | A61B 6/5247 382/128 |
| 2012/0162207 | A1* | 6/2012 | Hwang | H04L 67/38 345/419 |

(Continued)

*Primary Examiner* — Anh-Tuan V Nguyen

(57) ABSTRACT

Systems, devices, and methods relate to generation of augmented images using virtual content that is part of an augmented reality presentation and images of a scene captured via an image sensor. A wearable heads-up display (WHUD) may present an augmented reality presentation with virtual content projected into a field of view of a scene, while an image sensor captures images of the scene. The image sensor may be part of the WHUD or part of a separate device, for instance part of a smartphone. A wearer may view a scene via the WHUD and capture an image of all or a portion of the scene, for instance via a camera of either the WHUD or a separate device. An application monitors the virtual content and can generate an augmented image, which can be transmitted/printed, replicating the augmented reality experience and/or adding customized messages to the resulting augmented image.

20 Claims, 8 Drawing Sheets

(56) References Cited

U.S. PATENT DOCUMENTS

| | | | |
|---|---|---|---|
| 2013/0050258 A1* | 2/2013 | Liu | G06F 3/005 |
| | | | 345/633 |
| 2013/0050259 A1* | 2/2013 | Ahn | G06F 3/1454 |
| | | | 345/633 |
| 2013/0342570 A1* | 12/2013 | Kinnebrew | G09G 3/003 |
| | | | 345/633 |
| 2014/0204077 A1* | 7/2014 | Kamuda | A63F 13/335 |
| | | | 345/419 |
| 2014/0313228 A1* | 10/2014 | Kasahara | G06T 19/006 |
| | | | 345/633 |
| 2015/0193979 A1* | 7/2015 | Grek | G06F 1/1694 |
| | | | 345/633 |
| 2016/0212180 A1* | 7/2016 | Menezes | H04L 47/10 |
| 2016/0227133 A1* | 8/2016 | Jones | G06T 7/30 |
| 2016/0350973 A1* | 12/2016 | Shapira | G06F 3/011 |
| 2016/0357491 A1* | 12/2016 | Oya | G06F 3/1423 |
| 2017/0237789 A1* | 8/2017 | Harner | G06F 3/017 |
| | | | 709/205 |
| 2018/0018141 A1* | 1/2018 | Wang | G06T 11/60 |
| 2018/0082476 A1* | 3/2018 | Kline | G06T 7/70 |
| 2018/0130259 A1* | 5/2018 | Leefsma | G06F 3/04815 |
| 2018/0165885 A1* | 6/2018 | Rodriguez, II | G06T 19/006 |
| 2018/0174314 A1* | 6/2018 | Bippus | G06T 11/006 |
| 2018/0213175 A1* | 7/2018 | Hlavac | H04N 1/2183 |
| 2018/0253900 A1* | 9/2018 | Finding | G06T 19/006 |
| 2018/0293771 A1* | 10/2018 | Piemonte | G06Q 20/123 |
| 2019/0057529 A1* | 2/2019 | DiVerdi | H04L 65/403 |
| 2019/0088030 A1* | 3/2019 | Masterson | G01S 19/01 |
| 2019/0114061 A1* | 4/2019 | Daniels | G06F 3/04815 |
| 2019/0304196 A1* | 10/2019 | Driancourt | G06F 3/011 |
| 2019/0334698 A1* | 10/2019 | Singh | H04L 9/0637 |
| 2019/0370544 A1* | 12/2019 | Wright, Jr. | G06F 3/011 |
| 2020/0081524 A1* | 3/2020 | Schmidt | G06K 9/00671 |

* cited by examiner

AUGMENTED IMAGE GENERATION USING VIRTUAL CONTENT FROM WEARABLE HEADS UP DISPLAY

CROSS-REFERENCE TO RELATED APPLICATION

This application claims the benefit of U.S. Provisional Patent Application No. 62/773,851, filed Nov. 30, 2018, which is incorporated by reference herein in its entirety.

BACKGROUND

Technical Field

The present systems, devices, and methods generally relate to wearable heads up displays which present virtual content in a field-of-view, and generation of augmented images and image files which include at least some of the virtual content interposed on an image of a scene.

Description of the Related Art

Portable Electronic Devices

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be designed to operate without any wire-connections to other, non-portable electronic systems; however, a small and lightweight electronic device may still be considered portable even if it includes a wire-connection to a non-portable electronic system. For example, earphones may be considered a portable electronic device whether they are operated wirelessly or through a wire connection.

The convenience afforded by the portability of electronic devices has fostered a huge industry. Smartphones, audio players, laptop computers, tablet computers, and ebook readers are all examples of portable electronic devices. Further, portable electronic devices enable us to be continuously connected to other's in the world through communication networks such as the Internet or cellular communication networks. This makes it easier for users to connect and interact with other remote users.

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content ("virtual content") but also does not prevent the user from being able to see their external environment ("scene) encompassed by a field-of-view of the wearable heads-up display. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few. HUMAN-To-human interaction Humans frequently interact with each other directly, face-to-face, using verbal communication, as well as non-verbal communication like body language and facial expressions. There are many challenges humans face when interacting with another human, including at least remembering the other human's name and other relevant information, accurately identifying the other human's emotions and thoughts so as to appropriately respond, and remembering what was said after the interaction is over, among many other challenges. Further, many, if not most, humans struggle with at least one aspect of human-to-human interactions, and many humans struggles with many aspects of human-to-human interactions. For example, some people have significantly difficulty remembering the names of new people they meet, which can negatively impact their ability to form relationships with new people. As another example, some people have significant social anxiety, and struggle to find appropriate topics to discuss with other humans. As another example, some people may have difficulty understanding subtle interaction cues like body language and facial expression, and consequently may have difficulty interacting with other people in ways that ensure that all participants in the interaction feel comfortable. Thus, it is desirable to have means for providing interaction assistance to users to optimize their human-to-human interactions.

BRIEF SUMMARY

While wearable heads-up displays are a useful tool for the wearer or user, conventional wearable heads-up displays tend to have no or limited ability to share experiences between two or more wearers or users. This limitation may inhibit adoption of an otherwise useful tool.

As a high level summary, a person wearing a wearable heads up display (WHUD) which is presenting virtual content to create an augmented reality experience may wish to share, at least in part, that experience with others. To accomplish such one or more applications executing on one or more devices, may allow the user to take a picture or video of a scene, and generate an augmented image which includes the captured image and at least some of the virtual content which as being presented. In some implementations, the user may add additional content, for example a customize message and/or modify the virtual content that is included in the augmented image. The user can then share the augmented image with others, in any variety of forms. In some implementations, the user will capture an image or images of the scene with a camera in a smartphone, communicatively coupled to the WHUD. An application executing on the smartphone may monitor the WHUD, for example monitoring the virtual content being presented thereby. The smartphone may generate the augmented image, or may rely on some more computational suitable resource (e.g., back-end computer system, server computer) to generate the augmented image. Virtual content can take a variety of forms, for example weather, location, name of landmark, person or even, height of mountain or building, year built, and/or news. Additional content may take a variety of forms, for example a text message, a custom comment or label that you write ("Wish you were here").

A method of operation in a processor-based system may be summarized as including: for a first set of virtual content rendered in a field-of-view of a heads up display to populate a scene, registering the first set of content with a first image of at least a portion of the scene as captured by an image sensor of a first processor-based device that is distinct from the wearable heads up display; and generating an augmented image that includes at least a portion of the first image as captured by the image sensor with at least a portion of the first set of virtual content populated into the at least a portion of the first image as captured by the image sensor.

Registering the first set of content with a first image may include temporally registering the virtual content with the first image. Registering the first set of content with a first image may include determining a position and orientation of the virtual content with respect to at least a portion of a boundary of the first image. Registering the first set of content with a first image may include spatially registering the virtual content with one or more features in the first image. Spatially registering the first set of content with one or more features in the first image may include performing image recognition via one or more processors to recognize features in the first image, and identifying pieces of virtual content logically associated with the recognized features. Spatially registering the first set of content with one or more features in the first image may include performing image recognition via a first trained neural network to recognize features in the first image, wherein the first set of virtual content was generated using the first trained neural network. Generating an augmented image that includes at least a portion of the first image as captured by the image sensor with at least a portion of the first set of virtual content populated into the at least a portion of the first image as captured by the image sensor may include generating the augmented image with one or more pieces of the first set of virtual content populated at respective locations in the augmented image that match respective locations at which the virtual content was rendered in the scene. Generating an augmented image that includes at least a portion of the first image as captured by the image sensor with at least a portion of the first set of virtual content populated into the at least a portion of the first image as captured by the image sensor may include generating the augmented image with one or more pieces of the first set of virtual content which describe a first feature in the scene spatially mapped to the first feature in the augmented image. Generating an augmented image that includes at least a portion of the first image as captured by the image sensor with at least a portion of the first set of virtual content populated into the at least a portion of the first image as captured by the image sensor may include generating the augmented image with one or more pieces of the first set of virtual content that is not descriptive of any of the features in the augmented image populated at respective locations in the augmented image that match respective locations at which the virtual content was rendered in the scene.

The method may further include capturing the first image of at least a portion of the scene by the image sensor of the first processor-based device that is distinct from the wearable heads up display. The method may further include timestamping the first image.

The method may further include receiving the first set of virtual content by the first processor-based device that is distinct from the wearable heads up display, wherein generating the augmented image is performed by one or more processors of the first processor-based device that is distinct from the wearable heads up display.

The method may further include receiving the first image by the wearable heads up display, wherein generating the augmented image is performed by one or more processors of the wearable heads up display.

The method may further include receiving the first set of virtual content by a second processor-based device that is distinct from the wearable heads-up display and distinct from the first processor-based device, wherein generating the augmented image is performed by one or more processors of the second processor-based device that is distinct from the wearable heads-up display and distinct from the first processor-based device.

The method may further include transmitting the first set of virtual content to a second processor-based device that is distinct from the wearable heads-up display and distinct from the first processor-based device, wherein generating the augmented image is performed by one or more processors of the second processor-based device that is distinct from the wearable heads-up display and distinct from the first processor-based device.

The first processor-based device may include a smartphone having the at least one image sensor, a display, and executing an application and is communicatively coupled to the wearable heads-up display via a local communications channel. The wearable heads-up display may have no image sensors, and the method may further include monitoring by the application executing on the smartphone the virtual content rendered by the wearable heads-up display over time. The method may further include detecting by the application executing on the smartphone the first image being captured, and wherein the registering and the generating are responsive to detection of the first image being captured. The method may further include detecting by the application executing on the smartphone a user input representative of a selection of the captured first image captured, and wherein the registering and the generating are responsive to detection of the user input representative of a selection of the captured first image captured. Generating an augmented image that includes at least a portion of the first image as captured by the image sensor with at least a portion of the first set of virtual content populated into the at least a portion of the first image as captured by the image sensor may include generating the augmented image on the display of the smartphone. Generating an augmented image that includes at least a portion of the first image as captured by the image sensor with at least a portion of the first set of virtual content populated into the at least a portion of the first image as captured by the image sensor may include generating an augmented image file, and the method may further include transmitting the augmented image file from the smartphone via at least one radio.

A processor-based system may be summarized as including: at least one processor; at least one processor-readable medium, communicatively coupled to the at least one processor and which stores processor-executable instructions which, when executed by the at least one processor, cause the at least one processor to: for a first set of virtual content rendered in a field-of-view of a heads up display to populate a scene, register the first set of content with a first image of at least a portion of the scene as captured by an image sensor of a first processor-based device that is distinct from the wearable heads up display; and generate an augmented image that includes at least a portion of the first image as captured by the image sensor with at least a portion of the first set of virtual content populated into the at least a portion of the first image as captured by the image sensor.

To register the first set of content with a first image, the at least one processor may temporally register the virtual content with the first image. To register the first set of content with a first image the at least one processor may determine a position and orientation of the virtual content with respect to at least a portion of a boundary of the first image. To register the first set of content with a first image the at least one processor may spatially register the virtual content with one or more features in the first image. To spatially register the first set of content with one or more features in the first image the at least one processor may perform image recognition via one or more processors to recognize features in the first image, and identify pieces of virtual content logically associated with the recognized features. To spatially register the first set of content with one or more features in the first image the at least one processor may perform image recognition via a first trained neural network to recognize features in the first image, wherein the first set of virtual content was generated using the first trained neural network. To generate an augmented image that includes at least a portion of the first image as captured by the image sensor with at least a portion of the first set of virtual content populated into the at least a portion of the first image as captured by the image sensor the at least one processor may generate the augmented image with one or more pieces of the first set of virtual content populated at respective locations in the augmented image that match respective locations at which the virtual content was rendered in the scene. To generate an augmented image that includes at least a portion of the first image as captured by the image sensor with at least a portion of the first set of virtual content populated into the at least a portion of the first image as captured by the image sensor the at least one processor may generate the augmented image with one or more pieces of the first set of virtual content which describe a first feature in the scene spatially mapped to the first feature in the augmented image. To generate an augmented image that includes at least a portion of the first image as captured by the image sensor with at least a portion of the first set of virtual content populated into the at least a portion of the first image as captured by the image sensor the at least one processor may generate the augmented image with one or more pieces of the first set of virtual content that is not descriptive of any of the features in the augmented image populated at respective locations in the augmented image that match respective locations at which the virtual content was rendered in the scene, at least one of the pieces of virtual content comprising a customized message set by a user.

The processor-based system may further include at least one image sensor operable to capture the first image of at least a portion of the scene. The instructions, when executed, may cause the at least one processor to further timestamp the first image.

The one or more processors of the first processor-based device that that is distinct from the wearable heads up display may generate the augmented image.

One or more processors of the wearable heads-up display may generate the augmented image.

One or more processors of the second processor-based device that is distinct from the wearable heads-up display and distinct from the first processor-based device may generate the augmented image.

The instructions, when executed, may cause the at least one processor to further transmit the first set of virtual content to a second processor-based device that is distinct from the wearable heads-up display and distinct from the first processor-based device, wherein generating the augmented image is performed by one or more processors of the second processor-based device that is distinct from the wearable heads-up display and distinct from the first processor-based device.

The first processor-based device may include a smartphone having the at least one image sensor, a display, and which executes an application and is communicatively coupled to the wearable heads-up display via a local communications channel and the wearable heads-up display may have no image sensors. The application executing on the smartphone may monitor the virtual content rendered by the wearable heads-up display over time. The application executing on the smartphone may detect the first image being captured, and the registration and the generation may be responsive to detection of the first image being captured. The application executing on the smartphone may detect a user input representative of a selection of the captured first image captured, and the registration and the generating may be responsive to the detection of the user input representative of a selection of the captured first image captured. To generate an augmented image that includes at least a portion of the first image as captured by the image sensor with at least a portion of the first set of virtual content populated into the at least a portion of the first image as captured by the image sensor the at least one processor may generate the augmented image on the display of the smartphone. To generate an augmented image that includes at least a portion of the first image as captured by the image sensor with at least a portion of the first set of virtual content populated into the at least a portion of the first image as captured by the image sensor the at least one processor may generate an augmented image file, and causes the augmented image file to be transmitted from the smartphone via at least one radio.

A method of operation in a first processor-based device that is communicatively coupled to a wearable heads-up display that is distinct from the first processor-based device may be summarized as including: receiving, by the first processor-based device from the wearable heads up display, a first set of virtual content rendered in a field-of-view of the heads up display to populate a scene appearing in the field-of-view of the heads up display; capturing a first image by an image sensor of the first processor-based device; and generating, by the first processor-based device, an augmented image that includes at least a portion of the first image as captured by the image sensor of the first processor-based device with at least a portion of the first set of virtual content populated into the at least a portion of the first image as captured by the image sensor.

The method may further include registering the first set of virtual content with the first image. Registering the first set of virtual content with the first image may include determining a position and orientation of the first set of virtual content with respect to at least a portion of a boundary of the first image. Registering the first set of virtual content with the first image may include spatially registering the virtual content with one or more features in the first image. Spatially registering the first set of virtual content with one or more features in the first image may include performing image recognition via one or more processors to recognize features in the first image, and identifying pieces of virtual content logically associated with the recognized features. Spatially registering the first set of virtual content with one or more features in the first image may include performing image recognition via a first trained neural network to recognize features in the first image, wherein the first set of virtual content was generated using the first trained neural network.

Generating an augmented image that includes at least a portion of the first image as captured by the image sensor with at least a portion of the first set of virtual content populated into the at least a portion of the first image as captured by the image sensor may include generating the augmented image with one or more pieces of the first set of virtual content populated at respective locations in the augmented image that match respective locations at which the virtual content was rendered in the scene by the wearable heads up device.

Generating an augmented image that includes at least a portion of the first image as captured by the image sensor with at least a portion of the first set of virtual content populated into the at least a portion of the first image as captured by the image sensor may include generating the augmented image with one or more pieces of the first set of virtual content which describe at least one of: a first feature in the scene spatially mapped to the first feature in the augmented image, or conditions at a time the first image was captured.

Generating an augmented image that includes at least a portion of the first image as captured by the image sensor with at least a portion of the first set of virtual content populated into the at least a portion of the first image as captured by the image sensor may include generating the augmented image with one or more pieces of the first set of virtual content that is not descriptive of any of the features in the augmented image populated at respective locations in the augmented image that match respective locations at which the virtual content was rendered in the scene.

The first processor-based device may include a smartphone having the at least one image sensor, a display, and executing an application and is communicatively coupled to the wearable heads-up display via a local communications channel, and the wearable heads-up display may have no image sensors. The method may further include monitoring by the application executing on the smartphone the virtual content rendered by the wearable heads-up display over time. The method may further include detecting, by the application executing on the smartphone, the first image being captured, and wherein the generating is responsive to detection of the first image being captured. The method may further include detecting by the application executing on the smartphone a user input representative of a selection of the captured first image captured, and wherein the generating is responsive to detection of the user input representative of a selection of the captured first image captured. Generating an augmented image that includes at least a portion of the first image as captured by the image sensor with at least a portion of the first set of virtual content populated into the at least a portion of the first image as captured by the image sensor may include generating the augmented image on the display of the smartphone. Generating an augmented image that includes at least a portion of the first image as captured by the image sensor with at least a portion of the first set of virtual content populated into the at least a portion of the first image as captured by the image sensor may include generating an augmented image file, and the method may further include transmitting the augmented image file from the smartphone via at least one radio.

An article of manufacture may be summarized as including a nontransitory computer-readable medium that stores processor-executable instructions which, when executed by at least one processor, cause at least one processor to: access a first set of virtual content rendered in a field-of-view of the heads up display to populate a scene appearing in the field-of-view of the heads up display; and generate an augmented image that includes at least a portion of a first image as captured by the image sensor of the first processor-based device with at least a portion of the first set of virtual content populated into the at least a portion of the first image as captured by the image sensor.

The processor-executable instructions, when executed by at least one processor, may cause at least one processor further to register the first set of content with the first image. To register the first set of content with a first image the processor-executable instructions may cause at least one processor to determine a position and orientation of the virtual content with respect to at least a portion of a boundary of the first image. To register the first set of content with a first image the processor-executable instructions may cause at least one processor to spatially register the virtual content with one or more features in the first image. To spatially register the first set of content with one or more features in the first image the processor-executable instructions may cause at least one processor to perform image recognition via one or more processors to recognize features in the first image, and identify pieces of virtual content logically associated with the recognized features. To spatially register the first set of content with one or more features in the first image the processor-executable instructions may cause at least one processor to perform image recognition via a first trained neural network to recognize features in the first image, wherein the first set of virtual content was generated using the first trained neural network.

To generate an augmented image that includes at least a portion of the first image as captured by the image sensor with at least a portion of the first set of virtual content populated into the at least a portion of the first image as captured by the image sensor the processor-executable instructions may cause at least one processor to generate the augmented image with one or more pieces of the first set of virtual content populated at respective locations in the augmented image that match respective locations at which the virtual content was rendered in the scene by the wearable heads up device.

To generate an augmented image that includes at least a portion of the first image as captured by the image sensor with at least a portion of the first set of virtual content populated into the at least a portion of the first image as captured by the image sensor the processor-executable instructions may cause at least one processor to generate the augmented image with one or more pieces of the first set of virtual content which describe at least one of: a first feature in the scene spatially mapped to the first feature in the augmented image, or conditions at a time the first image was captured.

To generate an augmented image that includes at least a portion of the first image as captured by the image sensor with at least a portion of the first set of virtual content populated into the at least a portion of the first image as captured by the image sensor the processor-executable instructions may cause at least one processor to generate the augmented image with one or more pieces of the first set of virtual content that is not descriptive of any of the features in the augmented image populated at respective locations in the augmented image that match respective locations at which the virtual content was rendered in the scene.

The first processor-based device may include a smartphone having the at least one image sensor, a display, and the nontransitory processor readable medium that stores the instructions. The processor-executable instructions, when executed by at least one processor, may cause at least one processor further to: monitor the virtual content rendered by the wearable heads-up display over time. The processor-executable instructions, when executed by at least one processor, may cause at least one processor further to: detect the first image being captured, and the generating may be responsive to detection of the first image being captured. The processor-executable instructions, when executed by at least one processor, may cause at least one processor further to: detect a user input representative of a selection of the captured first image captured, and the generation may be responsive to detection of the user input representative of a selection of the captured first image captured.

To generate an augmented image that includes at least a portion of the first image as captured by the image sensor with at least a portion of the first set of virtual content populated into the at least a portion of the first image as captured by the image sensor the processor-executable instructions may cause at least one processor to generate the augmented image on the display of the smartphone.

To generate an augmented image that includes at least a portion of the first image as captured by the image sensor with at least a portion of the first set of virtual content populated into the at least a portion of the first image as captured by the image sensor the processor-executable instructions may cause at least one processor to generate an augmented image file, and the processor-executable instructions, when executed by at least one processor, may cause at least one processor further to cause the augmented image file to be transmitted from the smartphone via at least one radio.

A method of operation in a wearable heads-up display that includes a projector operable to project virtual content in a field of view that encompasses at least a portion of a scene, a camera including at least one image sensor operable to capture images of at least a portion of the scene, and at least one processor communicatively coupled to the camera, may be summarized as including: rendering a first set of virtual content in the field-of-view to populate at least a portion of the scene appearing in the field-of-view of the heads up display; capturing at least a first image of at least a portion of the scene by the image sensor of the camera of the wearable heads up display; and generating, by the first processor-based device, an augmented image that includes at least a portion of the first image as captured by the image sensor of the camera of the wearable heads up display with at least a portion of the first set of virtual content.

The method may further include: storing a plurality of sets of rendered virtual content in at least one memory of the wearable heads up display; and providing access to the stored sets of rendered virtual content to select one or more sets to generated one or more augmented images. Storing a plurality of sets of rendered virtual content in at least one memory of the wearable heads up display may include storing the plurality of sets of rendered virtual content with an indication of at least one of a time or a location at which the virtual content was rendered. Storing a plurality of sets of rendered virtual content in at least one memory of the wearable heads up display may include storing the plurality of sets of rendered virtual content with an indication of a location and an orientation of the wearable heads up display at time at which the virtual content was rendered.

Generating an augmented image may include spatially registering the virtual content with one or more features in the first image. Spatially registering the first set of content with the first image may include determining a position and orientation of the virtual content with respect to at least a portion of a boundary of the first image.

Generating an augmented image may include performing image recognition via one or more processors to recognize features in the first image, and identifying pieces of virtual content logically associated with the recognized features.

Generating an augmented image may include generating the augmented image with one or more pieces of the first set of virtual content which describe at least one of: a first feature in the scene spatially mapped to the first feature in the augmented image, or conditions at a time the first image was captured.

Generating an augmented image may include generating the augmented image with one or more pieces of the first set of virtual content that is not descriptive of any of the features in the augmented image populated at respective locations in the augmented image that match respective locations at which the virtual content was rendered in the scene.

Generating an augmented image may include generating the augmented image with one or more customized messages populated at respective locations in the augmented image.

The method may further include detecting by an application executing on the wearable heads up display a user input representative of a selection of the captured first image captured. The generating may be responsive to detection of the user input representative of a selection of the captured first image captured.

Generating an augmented image may include generating an augmented image file, and the method may further include transmitting the augmented image file from the wearable heads up display via at least one radio.

A wearable heads-up display may be summarized as including: a projector operable to project virtual content in a field of view that encompasses at least a portion of a scene; a camera including at least one image sensor operable to capture images of at least a portion of the scene; at least one processor communicatively coupled to the camera; and at least one non-transitory processor-readable medium that stores processor-executable instructions which, when executed by the at least one processor, causes the at least one processor to: render a first set of virtual content in the field-of-view to populate at least a portion of the scene appearing in the field-of-view of the heads up display; capture at least a first image of at least a portion of the scene by the image sensor of the camera of the wearable heads up display; and generate an augmented image that includes at least a portion of the first image as captured by the image sensor of the camera of the wearable heads up display with at least a portion of the first set of virtual content.

When executed, the instructions may cause the at least one processor further to: store a plurality of sets of rendered virtual content in at least one memory of the wearable heads up display; and provide access to the stored sets of rendered virtual content to select one or more sets to generated one or more augmented images. To store a plurality of sets of rendered virtual content in at least one memory of the wearable heads up display the at least one processor may store the plurality of sets of rendered virtual content with an indication of at least one of a time or a location at which the virtual content was rendered. To store a plurality of sets of rendered virtual content in at least one memory of the wearable heads up display the at least one processor may store the plurality of sets of rendered virtual content with an indication of a location and an orientation of the wearable heads up display at time at which the virtual content was rendered.

To generate an augmented image the at least one processor may determine a position and orientation of the virtual content with respect to at least a portion of a boundary of the first image.

To generate an augmented image the at least one processor may spatially register the virtual content with one or more features in the first image.

To generate an augmented image the at least one processor may perform image recognition via one or more processors to recognize features in the first image, and identify pieces of virtual content logically associated with the recognized features.

To generate an augmented image the at least one processor may generate the augmented image with one or more pieces of the first set of virtual content which describe at least one of: a first feature in the scene spatially mapped to the first feature in the augmented image, or conditions at a time the first image was captured.

To generate an augmented image the at least one processor may generate the augmented image with one or more pieces of the first set of virtual content that is not descriptive of any of the features in the augmented image populated at respective locations in the augmented image that match respective locations at which the virtual content was rendered in the scene.

To generate an augmented image the at least one processor may generate the augmented image with one or more customized messages populated at respective locations in the augmented image.

When executed, the instructions may cause the at least one processor further to: detect a user input representative of a selection of the captured first image captured. The generation of the augmented image may be responsive to detection of the user input representative of a selection of the captured first image captured.

The wearable heads-up display may further include at least one radio, wherein to generate an augmented image the at least one processor may generate an augmented image file. When executed, the instructions may cause the at least one processor further to transmit the augmented image file from the wearable heads up display via at least one radio.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed implementations and embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one implementation" or "an implementation" or "one embodiment" or "an embodiment" means that a particular feature, structures, or characteristics may be combined in any suitable manner in one or more implementations or embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Reference throughout this specification and the claims to "an image" or "images" means one or more images including at least one image, e.g., a still image or single frame of a digital image, and "moving images" or video or GIFs or other forms of sequential image frames to provide the perception of motion.

The headings and Abstract of the Disclosure provided herein are for convenience only and do not interpret the scope or meaning of the embodiments.

Figure 1:
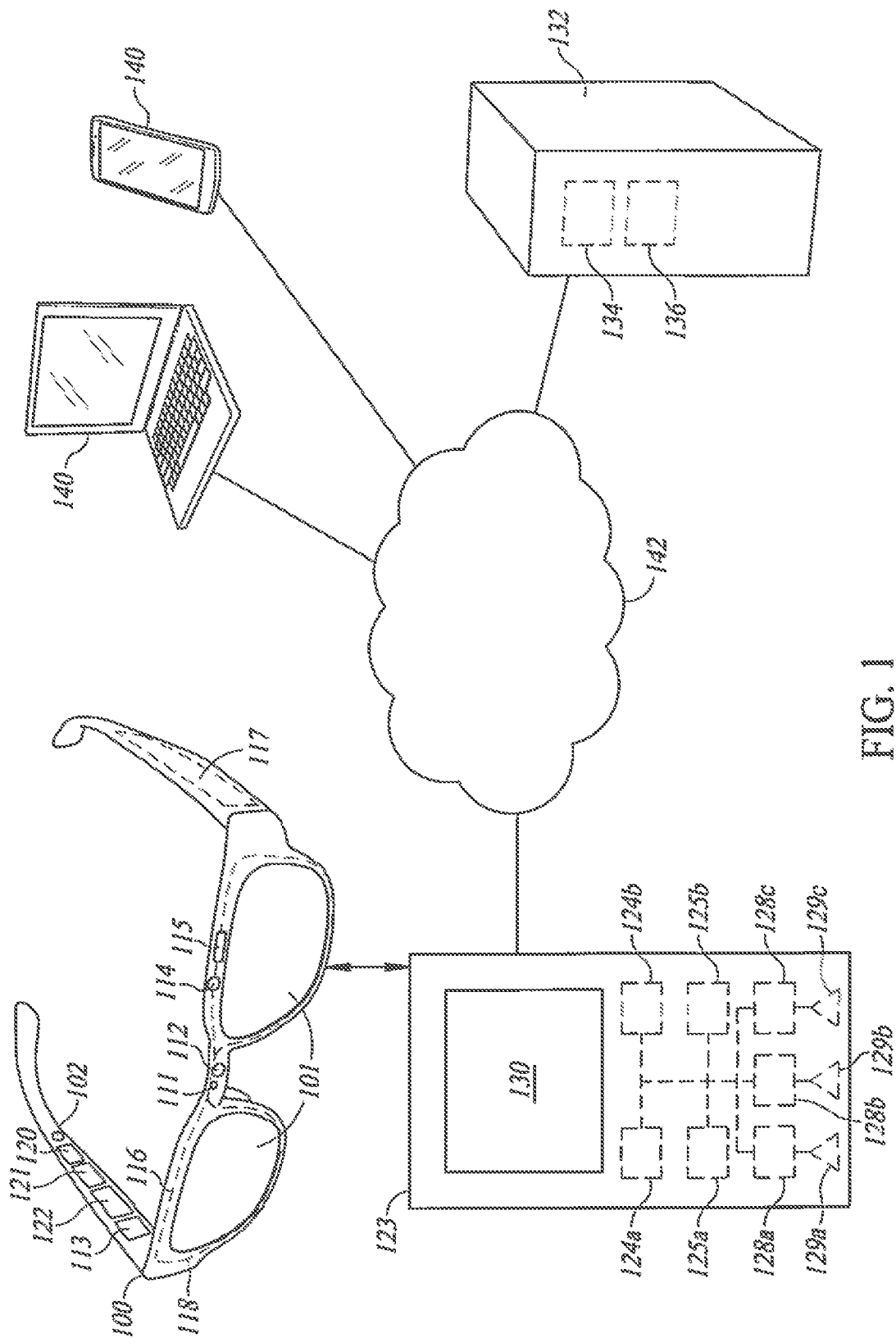
FIG. 1 is an isometric view of an environment including an exemplary wearable heads-up display ("WHUD"), a first processor-based device (e.g., smartphone, tablet computer) proximate to and communicatively coupled to the WHUD, an optional second processor-based device communicatively coupleable to the first processor-based device, and an optional third processor-based device (e.g., another WHUD, another smartphone or tablet computer, a laptop or desktop computer) communicatively coupleable to either the first or the second processor-based devices, according to the present systems, devices, and methods.

FIG. 1 illustrates an environment which includes an exemplary wearable heads-up display ("WHUD") 100 which can be used in the present systems, devices, and methods. FIG. 1 includes many structures which can be included on a WHUD as used in the present systems, devices, and methods, but one skilled in the art will appreciate that each of the illustrated structures in FIG. 1 is not required to achieve the present systems, devices, and methods, as will be discussed in more detail below. WHUDs as employed in the present systems, devices and method can be based on, for example, the WHUDs disclosed in U.S. Non-Provisional patent application Ser. No. 15/145,576, U.S. Non-Provisional patent application Ser. No. 15/167,458, or U.S. Non-Provisional patent application Ser. No. 15/046,254.

WHUD 100 as shown in FIG. 1 includes multiple output devices which can be used to present information and/or user interfaces to a user. These output devices can include, for example, display 101, speaker 102, haptic output interface (not shown), and any other output device as appropriate for a particular application. A WHUD in accordance with the present systems, devices, and methods can optionally include a plurality, all, or a combination of these output devices as shown in FIG. 1, but only requires only a single output device, such as a single display 101, a single speaker 102, or a single haptic output interface. Further, a WHUD in accordance with the present systems, devices, and methods can also include a plurality of any or all of the described output devices, such as a plurality of displays 101, a plurality of speakers 102, and/or a plurality of haptic output interfaces.

WHUD 100 as shown in FIG. 1 includes multiple sensors, which can be used to capture input which can indicate a context of the user, and which can be used to capture input from the user which provides instructions to the WHUD 100. These sensors can include microphone 111, optionally a camera (not shown), inertial measurement unit ("IMU") 113, eye-tracking system 114, proximity sensors 115 and any other sensor as appropriate for a particular application. A WHUD in accordance with the present systems, devices, and methods can optionally include a plurality, all, or a combination of these sensors as shown in FIG. 1, but only requires a single sensor, such as a single microphone 111, a single camera 112, a single inertial measurement unit 113, a single eye-tracking system 114, or a single proximity sensor 115. Further, a WHUD in accordance with the present systems, devices, and methods can also include a plurality of any or all of the described sensors, such as a plurality of microphones 111, a plurality of cameras 112, a plurality of inertial measurement units 113, a plurality of eye-tracking systems 114, and/or a plurality of proximity sensors 115. Since the above described sensors can be used to capture and measure information indicating context of a user of the system, throughout this specification the term "user context sensor" can refer to any of the above described sensors, or any other sensors which can be carried by a WHUD in accordance with the present invention, as appropriate for a given application. However, one skilled in the art will appreciate that the above described sensors can be more than just "user context sensors", in that the above described sensors can perform functions beyond just capturing user context, such as capturing user instructions, for example.

WHUD 100 as shown in FIG. 1 also includes at least one processor 120 and a non-transitory processor-readable medium 121 communicatively coupled to the at least one processor 120. The at least one processor 120 can be any suitable component which can execute instructions or logic, including but not limited to micro-controllers, microprocessors, multi-core processors, integrated-circuits, application specific integrated circuits (ASICs), field programmable gate arrays (FGPAs), central processing units (CPUs), digital signal processors (DSPs), graphics processing units (GPUs), programmable logic controllers (PLCs), or any appropriate combination of these components. The non-transitory processor-readable medium 121 can be any suitable component which can store instructions, logic, or programs, including but not limited to non-volatile or volatile memory, read only memory (ROM), random access memory (RAM), FLASH memory, registers, magnetic hard disk, optical disk, or any combination of these components. The non-transitory processor-readable medium 121 can store processor executable instructions which, when executed by the at least one processor 120, cause the WHUD 100 to implement the present systems, devices, and methods. Further, each of the output devices and sensors can be communicatively coupled to the at least one processor 120. That is, the at least one processor 120 is communicatively coupled to at least display 101, speaker 102, haptic output interface 103, microphone 111, camera 112, inertial measurement unit 113, eye tracking system 114, and proximity sensors 115.

Optionally, WHUD 100 can include wireless communication hardware, such as a wireless receiver, a wireless transmitter, and/or a wireless transceiver (collectively or individually radio) and associated antenna 116, to provide wireless communications (e.g., radio frequency, microwave frequency) with peripheral devices and/or external servers and content providers. FIG. 1 illustrates an exemplary wireless transceiver 122.

WHUD 100 typically includes one or more can include typically includes one or more power sources 117, for example one or more secondary batteries electrically coupled to the electronics via one or more power supply lines 118.

Certain elements of FIG. 1 are drawn in dashed lines, to indicate that these devices or structures are not normally visible at the current perspective of WHUD 100 as shown in FIG. 1, because the dashed elements are enclosed within a housing of the WHUD 100, or are occluded by other features such as the support structure or housing of WHUD 100. However, one skilled in the art will appreciate that these devices or structures do not necessarily have to be enclosed in the housing or behind other features of WHUD 100, but can be carried external to the housing or partially external as appropriate for a given application. Further, one skilled in the art will appreciate that although the output devices and sensors are shown at certain locations of the support structure of WHUD 100, one skilled in the art will appreciate that any of the output devices and sensors can be relocated to any location on the support structure as appropriate for a particular application.

As also illustrated in FIG. 1, a first processor-based device 123 may be communicatively coupled to the WHUD 100. The first processor-based device 123 may take a variety of forms, for instance a smartphone (illustrated) or a tablet computer. The first processor-based device 123 typically includes one or more processors 124a, 124b (collectively 124) and one or more nontransitory processor-readable media 125a, 125b (collectively 125) that stores one or more sets of instructions (e.g., application 126) executable by the at least one processor 124. The processor(s) 124 may take any of a variety of forms, for instance one or more microcontrollers, microprocessors, integrated-circuits, ASICs, FPGAs, CPUs, DSPs, GPUs, and PLCs. A Snapdragon processor or Apple A12 processor may be particular suited for use in mobile communications device type devices. The nontransitory processor-readable media 125 can be any suitable component which can store instructions, logic, or programs, including but not limited to non-volatile or volatile memory, read only memory (ROM), random access memory (RAM), FLASH memory, registers, magnetic hard disk, optical disk, or any combination of these components. In implementations in which the first processor-based device 123 takes the form of a mobile communications device (e.g., smartphone), the non-transitory processor-readable medium 125 will typically include ROM, RAM, Flash memory and registers. The non-transitory processor-readable medium 125 can store processor executable instructions which, when executed by the at least one processor 120, cause the first processor-based device 123 to implement the present systems, devices, and methods.

The first processor-based device 123 typically includes a user interface in the form of a touch sensitive display screen 130, via which a graphical user interface and information may be presented and commands and other input received. The first processor-based device 123 also typically includes one or more cameras or image sensors 127 or cameras, operable to capture images. The first processor-based device 123 further typically includes one or more radios 128a, 128b, 128c (collectively 128) and associated antennas 129a, 129b, 129c, for example one or more cellular communications radios 128a, one or more WI-FI radios 128b, and one or more Bluetooth radios 128c, operable to provide communications to and from the first processor-based device 123. The first processor-based device 123 typically includes one or more power sources (not shown), for example one or more secondary batteries. The first processor-based device 123 typically includes one or more buses (not shown), e.g., power bus, communications bus, instructions bus, data bus) that provides communications between components.

As also illustrated in FIG. 1, optionally a second processor-based device 132 may be communicatively coupled to the first processor-based device 123. The second processor-based device 132 may take a variety of forms including any type of digital computer system In some implementations, the second processor-based device 132 takes the form of one or more server computer systems or backend computing systems, which may be remotely located from the first processor-based device 123, and which may be centralized or distributed. Such may take the form of a backend system operable to perform image processing for instance using machine learning or artificial neural networks, for instance where the computational complexity warrants the overhead of additional communications. Additionally or alternatively, such may take the form of a backend system operable to provide access to augmented images to a variety of users, for instance implemented as a social sharing network system.

The second processor-based device 132 typically includes one or more processors 134 and one or more nontransitory processor-readable media 136 that stores one or more sets of instructions (e.g., application 138) executable by the at least one processor 134. The processor(s) 134 may take any of a variety of forms, for instance one or more micro-controllers, microprocessors, integrated-circuits, ASICs, FPGAs, CPUs, DSPs, GPUs, and PLCs. The nontransitory processor-readable media 136 can be any suitable component which can store instructions, logic, or programs, including but not limited to non-volatile or volatile memory, read only memory (ROM), random access memory (RAM), FLASH memory, registers, magnetic hard disk, optical disk, or any combination of these components.

As also illustrated in FIG. 1, optionally a third processor-based device 140a, 140b (collectively 140) may be communicatively coupled to the first processor-based device 123 or the second processor-based device 132. The third processor-based device 140 may take a variety of forms. For example, the third processor-based device 140 may take the form of another WHUD, another smartphone or tablet computer or other mobile communications device, a laptop or desktop computer, a printer, or any other operable to render an augmented image in either transitory or nontransitory (e.g., printed) form. The third processor-based device 140 may, for example, be a device operated by a person who which the wearer or user of the WHUD 100 wants to share an experience, in the form of an augmented image. The third processor-based device 140 may be a device operated by the person who which the wearer or user of the WHUD 100 wants to share an experience, in the form of a printed instance of an augmented image.

One or more communications channels 142 (e.g., communications networks) provides communications between various components.

While the various processor-based devices can take any of a large variety of forms, and any variety of combinations may employed, one particular implementation is described immediately below to provide a better explanation of the technical challenges that are addressed herein in generation and provision of augmented images where a WHUD 100 presents virtual content in a field-of-view that encompasses a scene, and a camera or other image sensor captures an image encompassing all or a portion of the scene. The image sensor may be part of a device that is separate and independent from the WHUD 100, for instance a first processor-based device (e.g., smartphone) to which the WHUD 100 is communicatively coupled.

In this implementation, the WHUD 100 is provided in the form of eyewear that closely resembles a typical pair of eyeglass or sunglasses. In order for the WHUD 100 to be worn like conventional eyeglasses or sunglasses, and preferably visually resemble conventional eyeglasses or sunglasses, there are severe limits place on size and weight of the eyewear including electronics and power source. For example, limited volume may place a limit on the number of components and size of components. For instance, there may be insufficient room for an image sensor or camera in the WHUD 100. Also for example, limited volume may place a significant limitation on the size of the power source, and hence the power available between charges. This in turn can place significant limitations on the electronics, for instance making the use of extremely low power consumption components such as the microprocessor advisable. The limitation on the microprocessor can in turn limit the functions which can be performed on-board the WHUD 100. Even where the microprocessor of the WHUD 100 is capable of performing certain functions, it may still be advisable to offload the functions to be performed by more capable devices, for instance devices with a large power source.

In the case of a WHUD 100 that resembles conventional eye, the WHUD 100 may, for example, have slightly larger (e.g., wider, thicker) temples as compared to conventional eyeglass or sunglasses to contain the electronics and power source. For example, one temple (e.g., right temple arm) may hold a processor, memory, projector, and radio, while the other temple (e.g., left temple arm) may hold a secondary battery to supply power to the electronics.

Thus, the WHUD 100 may employ low power consumption processor(s) 120, lower than the power consumption of the processor(s) 124 of the first processor-based device 123, which in turn may be relatively low power consuming devices relative to desktop or even laptop computers. The processors 134 of a second processor-based device 132 (e.g., server or backend computer system) can be relatively high power consuming devices relative to processor(s) 124 of the first processor-based device 123. Thus, particular computationally intensive or power consuming activities or functions may be offloaded to devices with suitable electronics and sources of power.

The projector(s) can take any of a large variety of forms that are operable to produce or provide or otherwise project light to create a spatial pattern or image comprising virtual content (e.g., alphanumeric text, icons, graphics, images, moving graphics or images such as animoji, GIFs). Projectors may, for example, include micro-displays (e.g., liquid crystal displays (LCDs), liquid crystal on silicon displays (LCoS), arrays of digital micro-mirrors (DMDs) and associated light source(s) (DLPs), organic light emitting diodes (OLEDs) or arrays of OLEDs, scanning lasers, optical waveguides, solid state light sources (e.g., light emitting diodes) or arrays of solid state light sources, or even cathode ray tubes. Preferably, the projector(s) are lightweight and occupy a relatively small volume, such that the projector(s) can be accommodated in a wearable heads up display.

Further, the WHUD 100 may employ only a low power consumption radio 128c (e.g., Bluetooth), while the first processor-based device 123 may include higher power consumption radios (e.g., cellular radio, Wi-Fi radio) in addition to the low power consumption radio (e.g., Bluetooth).

In at least one implementation, a WHUD 100 is communicatively coupled (e.g., via Bluetooth) to a first processor-based device 123 (e.g., smartphone) in close proximity to, the WHUD 100. This advantageously allows power intensive functions and relatively larger or heavier hardware to be located separately from the WHUD 100, while still providing the WHUD 100 access to such functions and hardware. These may, for example, include sophisticated processors, cellular radios, Wi-Fi radios, imagers or cameras. Notably, the first processor-based device 123 can be a separate device from the WHUD 100, physically distinct from the WHUD 100, and may be carried by a wearer or user for instance in a pocket or holster.

In such implementations, an application (i.e., set of processor-executable instructions) may execute on the first processor-based device 123, communicatively coupled to the WHUD 100, monitoring activity occurring on the WHUD 100 (e.g., monitoring the virtual content being rendered or inputs received via the WHUD 100) and providing services thereto. The application executing on the first processor-based device 123 may perform all or most of the activities involved in generating augmented images from captured images and from the virtual content rendered via the WHUD. In some implementations, a second processor-based device 132 (e.g., a backend server) may perform some or even all of the activities involved in generating augmented images from captured images and from the virtual content rendered via the WHUD 100. Such may be particularly advantageous when performing computational intensive tasks, accessing an excessively large dataset, or in providing access to generated augmented images in a social media network.

In other implementations, the WHUD 100 may include sufficient computational resources and one or more image sensors. In such implementations, an application may execute on a processor of the WHUD 100, performing all or most of the activities involved in generating augmented images from captured images and from the virtual content rendered via the WHUD 100.

Various processes or methods of operation suitable for one or more of the various implementation are described below with reference to the flow diagrams.

Figure 2:
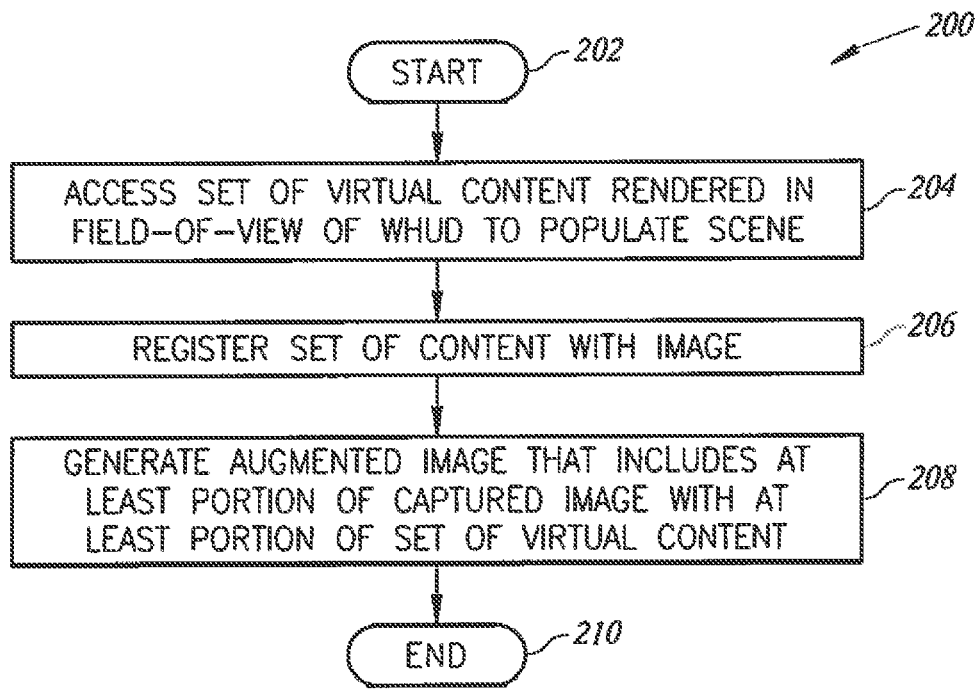
FIG. 2 is a flow diagram that shows a high level method of operation to produce augmented images in accordance with the present systems, devices, and methods.

FIG. 2 shows a high level method 200 of operation to produce augmented images in accordance with the present systems, devices, and methods. Method 200 may be implemented using one or more applications executing on WHUD 100, first processor-based device 123, and/or second processor-based device 132, and reference numerals below referring to hardware components appear in FIG. 1. One skilled in the art will appreciate that method 200 may also be implemented on any hardware as appropriate for a given application. Method 200 includes acts 202, 204, 206, 2018, and 210, but one skilled in the art will appreciate that in alternative implementations certain acts may be omitted and/or additional acts may be added. One skilled in the art will also appreciate that the illustrated order of the acts is shown for exemplary purposes only and may change in alternative implementations.

The method 200 starts at 202, for example in response to invocation of an application or routine or subroutine, in response to detection of an image (e.g., photo or video) being captured, in response to a user input, or in response to a startup or application of power to a device or establishment of a communications connection or receipt of a request or information via the communications.

At 204, an application executing on a processor-based device (e.g., first processor-based device, second processor-based device, WHUD) accesses a first set of virtual content rendered in a field-of-view of the heads up display to populate a scene appearing in the field-of-view of the heads up display.

Optionally at 206, an application executing on a processor-based device (e.g., first processor-based device, second processor-based device, WHUD) registers the first set of content with a first image.

At 208, an application executing on a processor-based device (e.g., first processor-based device, second processor-based device, WHUD) generates an augmented image that includes at least a portion of a first image as captured by the image sensor of the first processor-based device with at least a portion of the first set of virtual content populated into the at least a portion of the first image as captured by the image sensor.

The method 200 terminates at 210, for example until invoked again.

Figure 3:
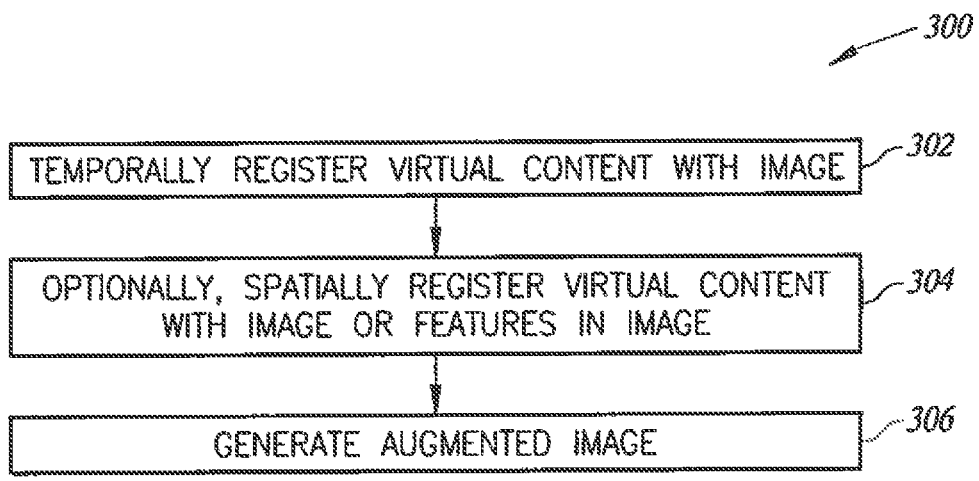
FIG. 3 is a flow diagram that shows an exemplary low level method of operation to produce augmented images in accordance with the present systems, devices, and methods.

FIG. 3 shows a low level method 300 of operation to produce augmented images in accordance with the present systems, devices, and methods. Method 300 may be performed in executing the registration 206 of method 200 (FIG. 2). Method 300 may be implemented via one or more applications executing on WHUD 100, first processor-based device 123 and/or second processor-based device 132, and reference numerals below referring to hardware components are illustrated in FIG. 10. One skilled in the art will appreciate that method 300 may also be implemented on any hardware as appropriate for a given application. Method 300 includes acts 302, 304, and 306, but one skilled in the art will appreciate that in alternative implementations certain acts may be omitted and/or additional acts may be added. One skilled in the art will also appreciate that the illustrated order of the acts is shown for exemplary purposes only and may change in alternative implementations.

At 302, an application executing on a processor-based device (e.g., first processor-based device, second processor-based device, WHUD) temporally registers the virtual content with the image. For example, one or more processors can determine which set of virtual content from a plurality of sets of virtual content was displayed concurrently or within a defined period of the capture of the first image. The processor(s) may employ a respective time stamp associated with each set of virtual content that represents a time (e.g., date, hour, minute, second) at which the first set of virtual content was rendered. The processor(s) may employ a respective time stamp associated with each captured image that represents a time (e.g., date, hour, minute, second) at which the image was captured. In these implementations, the WHUD may time stamp each set of virtual content, for instance when rendering the same, alternatively, where an application is executing on the first processor-based device, the application can time stamp the sets of virtual content as the application monitors the activity on the WHUD. In these implementations, the first processor-based device may time stamp each image as the image is captured. Such may be an inherent function of the operating system of the first processor-based device, or may be implemented by the application running on the first processor-based device under the operating system.

Optionally at 304, an application executing on a processor-based device (e.g., first processor-based device, second processor-based device, WHUD) spatially registers the virtual content with the image. The application may employ any one or more of a variety of techniques to perform spatial registration. For example, the processor-executable instructions may cause at least one processor to determine a position and orientation of the virtual content with respect to at least a portion of a boundary of the first image. For instance, the processor(s) may modify a size and orientation of a frame of the virtual content to match a size and orientation of the first image. In some implementations, the application may prompt the user to frame field-of-view of the image sensor (e.g., camera) to resemble the field-of-view of the WHUD. Also for example, the processor-executable instructions may cause at least one processor to spatially register the virtual content with one or more features or content (e.g., landmark, person, vehicle) appearing in the first image. In performing such, the processor-executable instructions may, for example, cause at least one processor to perform image recognition via one or more processors to recognize features in the first image, and identifying pieces of virtual content logically associated with the recognized features. For instance, the processor-executable instructions may cause at least one processor to perform image recognition via a first trained neural network to recognize features in the first image, wherein the first set of virtual content was generated using the first trained neural network.

At 306, an application executing on a processor-based device (e.g., first processor-based device, second processor-based device, WHUD) generates the augmented image with one or more pieces of the first set of virtual content populated at respective locations in the augmented image that match respective locations at which the virtual content was rendered in the scene by the wearable heads up device.

In at least some implementations, the first set of virtual content may, for example, identify or describe at least one of: a first feature (e.g., landmark, person, event) in the scene spatially mapped to the first feature in the augmented image, or conditions at a time the first image was captured.

In at least some implementations, the first set of virtual content may, for example, not actually identify any of the specific features (e.g., landmark, person) in the augmented image. For example, rather than identifying a specific landmark, individual or event, some or all of the virtual content may represent conditions at a location (e.g., time, temperature, weather, season, general location, general mood).

Figure 4A:
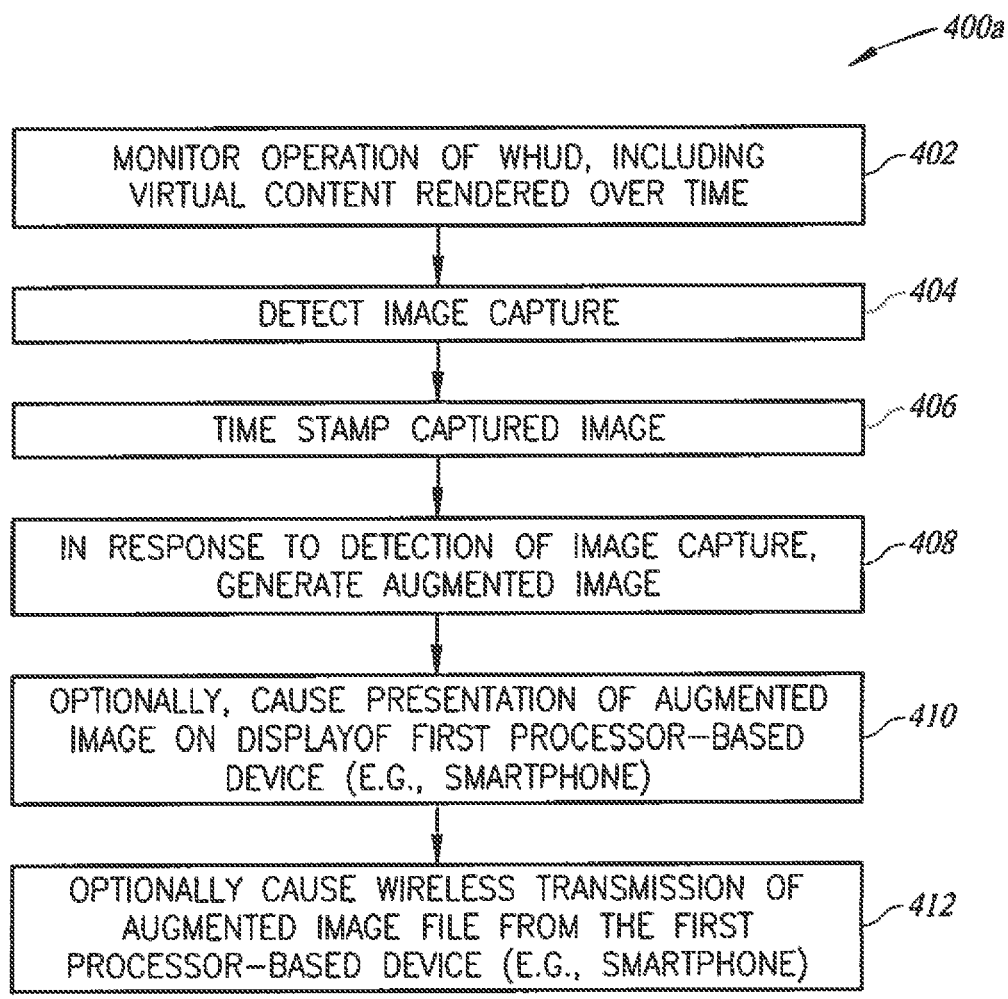
FIG. 4A is a flow diagram that shows an exemplary low level method of operation to produce augmented images in accordance with the present systems, devices, and methods.

FIG. 4A shows a low level method 400a of operation to produce augmented images in accordance with the present systems, devices, and methods. The method 400a may be performed via an application executing on a first processor-based device 123 (e.g., smartphone) that is distinct from, and communicatively coupled to, a WHUD 100. One skilled in the art will appreciate that method 400a may also be implemented on any hardware as appropriate for a given application. Method 400a includes acts 402, 404, 406, 408, 410, and 412, but one skilled in the art will appreciate that in alternative implementations certain acts may be omitted and/or additional acts may be added. One skilled in the art will also appreciate that the illustrated order of the acts is shown for exemplary purposes only and may change in alternative implementations.

At 402, an application 126 executing by at least one processor 124 of the first processor-based device 123 monitors the operation of the WHUD 100, including the virtual content rendered by the wearable heads-up display over time. This monitoring may be continuous, periodic or aperiodic, for example based on pushes by the WHUD 100 to the first processor-based device 123 or based on pulls by the first processor-based device 123 from WHUD 100. The application 126 may time stamp the virtual content, or the processor 120 of WHUD 100 may time stamp the virtual content. Alternatively, the application 126 may simply rely on a lack of lag in transferring virtual content, in selecting the particular set of virtual content that arrives at, or just before or just following an image capture. This may be particularly suitable where the WHUD 100 allows sets of virtual content to persist for relatively long periods (e.g., 10 seconds) before displaying a new set of virtual content.

At 404, an application 126 executing by at least one processor 124 of the first processor-based device 123 detects an image being captured by an image sensor 127, e.g., a camera of the first processor-based device 123.

Optionally at 406, an application 126 executing by at least one processor 124 of the first processor-based device 123 time stamps the captured image. This may facilitate temporal registration with a respective one of a plurality of sets of virtual content successively rendered by the WHUD 100.

At 408, in response to the detection of the image being captured, an application 126 executing by at least one processor 124 of the first processor-based device 123 generates an augmented image that includes at least a portion of a first image as captured by the image sensor 127 of the first processor-based device 123 with at least a portion of the first set of virtual content populated into the at least a portion of the first image as captured by the image sensor 127.

Optionally at 410, an application 126 executing by at least one processor 124 of the first processor-based device 123 causes a presentation of the augmented image on the display 130 of the first processor-based device 123 (e.g., smartphone).

Optionally at 412, an application 126 executing by at least one processor 124 of the first processor-based device 123 causes an augmented image file to be wirelessly transmitted from the first processor-based device 124 (e.g., smartphone) via at least one radio 128 and associated antenna 129 of the first processor-based device 130. For example, the first processor-based device 123 may transmit the augmented image to the third processor-based device 140 (e.g., another WHUD, another smartphone, tablet computer, laptop or desktop computer) to share with another user. Such communications may occur directly or indirectly between the first processor-based device 123 and the third processor-based device 140, and may even occur via second processor-based device 132 (e.g., social media server). The augmented image file may in at least some instances be a printable image filed.

Figure 4B:
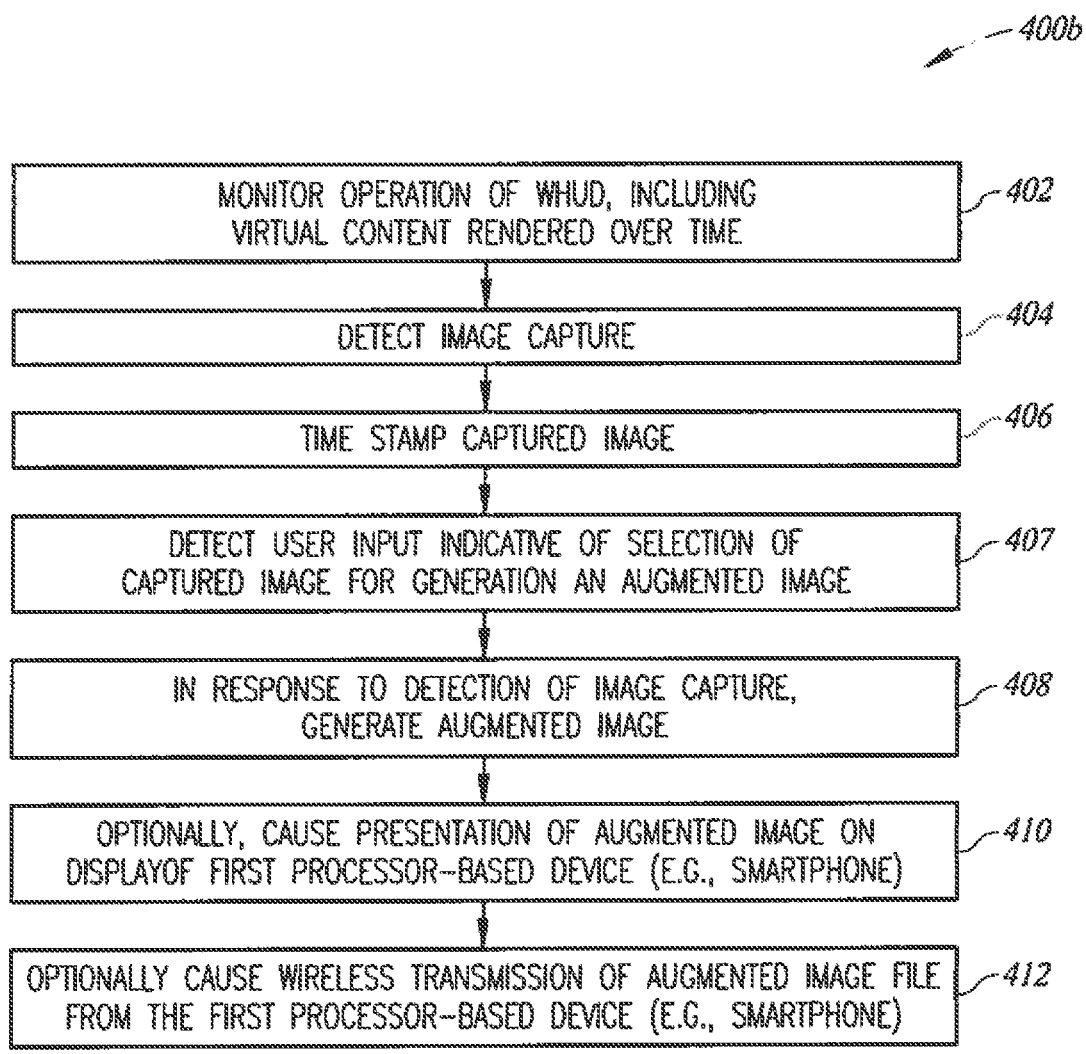
FIG. 4B is a flow diagram that shows an exemplary low level method of operation to produce augmented images in accordance with the present systems, devices, and methods.

FIG. 4B shows a low level method 400b of operation to produce augmented images in accordance with the present systems, devices, and methods. The method 400b may be performed via an application executing on a first processor-based device 123 (e.g., smartphone) that is distinct from, and communicatively coupled to, a WHUD 100. One skilled in the art will appreciate that method 400b may also be implemented on any hardware as appropriate for a given application. Method 400b includes acts 402, 404, 406, 407, 408, 410, and 412, but one skilled in the art will appreciate that in alternative implementations certain acts may be omitted and/or additional acts may be added. One skilled in the art will also appreciate that the illustrated order of the acts is shown for exemplary purposes only and may change in alternative implementations. Many of the acts of the method 400b are similar, or even identical, to the acts of the method 400a (FIG. 4A). Similar or even identical acts are identified using the same reference numbers in FIG. 4B as used in FIG. 4A.

At 402, an application 126 executing by at least one processor of the first processor-based device 123 monitors the operation of the WHUD 100, including the virtual content rendered by the WHUD 100 over time. This monitoring may be continuous, periodic or aperiodic, for example based on pushes by the WHUD 100 to the first processor-based device 123 or based on pulls by the first processor-based device 123 from WHUD 100. The application 126 may time stamp the virtual content, or the processor of WHUD 100 may time stamp the virtual content. Alternatively, the application 126 may simply rely on a lack of lag in transferring, selecting the particular set of virtual content that arrives at, or just before or just following an image capture. This may be particularly suitable where the WHUD 100 does allows sets of virtual content to persist for relatively long periods (e.g., 10 seconds) before displaying a new set of virtual content.

At 404, an application 126 executing by at least one processor 124 of the first processor-based device 123 detects an image being captured by an image sensor 127, e.g., a camera of the first processor-based device 123.

Optionally at 406, an application 126 executing by at least one processor 124 of the first processor-based device 123 time stamps the captured image. This may facilitate temporal registration with a respective one of a plurality of sets of virtual content successively rendered by the WHUD 100.

At 407, an application 126 executing by at least one processor 124 of the first processor-based device 123 detects a user input indicative of selection of the captured image for generation of an augmented image. In contrast to the method 400a, in the method 400b a user may wait a relatively long time after an image is captured before deciding to have an augmented image generated. In fact, one, more or even many images may be captured between the capture of the image selected to be used to generate the augmented image and the actual selection of that image to generate the augmented image. Having the virtual content and the images time stamped is facilitates this later generation of the augmented image based on much earlier rendered virtual content and much earlier captured images.

At 408, in response to the user selection, an application 126 executing by at least one processor 124 of the first processor-based device 123 generates an augmented image that includes at least a portion of a first image as captured by the image sensor 127 of the first processor-based device 123 with at least a portion of the first set of virtual content populated into the at least a portion of the first image as captured by the image sensor 127.

Optionally at 410, an application 126 executing by at least one processor 124 of the first processor-based device 123 causes a presentation of the augmented image on the display 130 of the first processor-based device 123 (e.g., smartphone).

Optionally at 412, an application 126 executing by at least one processor 124 of the first processor-based device 123 causes an augmented image file to be wirelessly transmitted from the first processor-based device (e.g., smartphone) via at least one radio 128 and associated antenna 129 of the first processor-based device 123. For example, the first processor-based device 123 may transmit the augmented image to the third processor-based device 140 (e.g., another WHUD, another smartphone, tablet computer, laptop or desktop computer) to share with another user. Such communications may occur directly or indirectly between the first processor-based device 123 and the third processor-based device 140, and may even occur via second processor-based device 132 (e.g., social media server). The augmented image file may, in at least some instances, be a printable image filed.

Figure 4C:
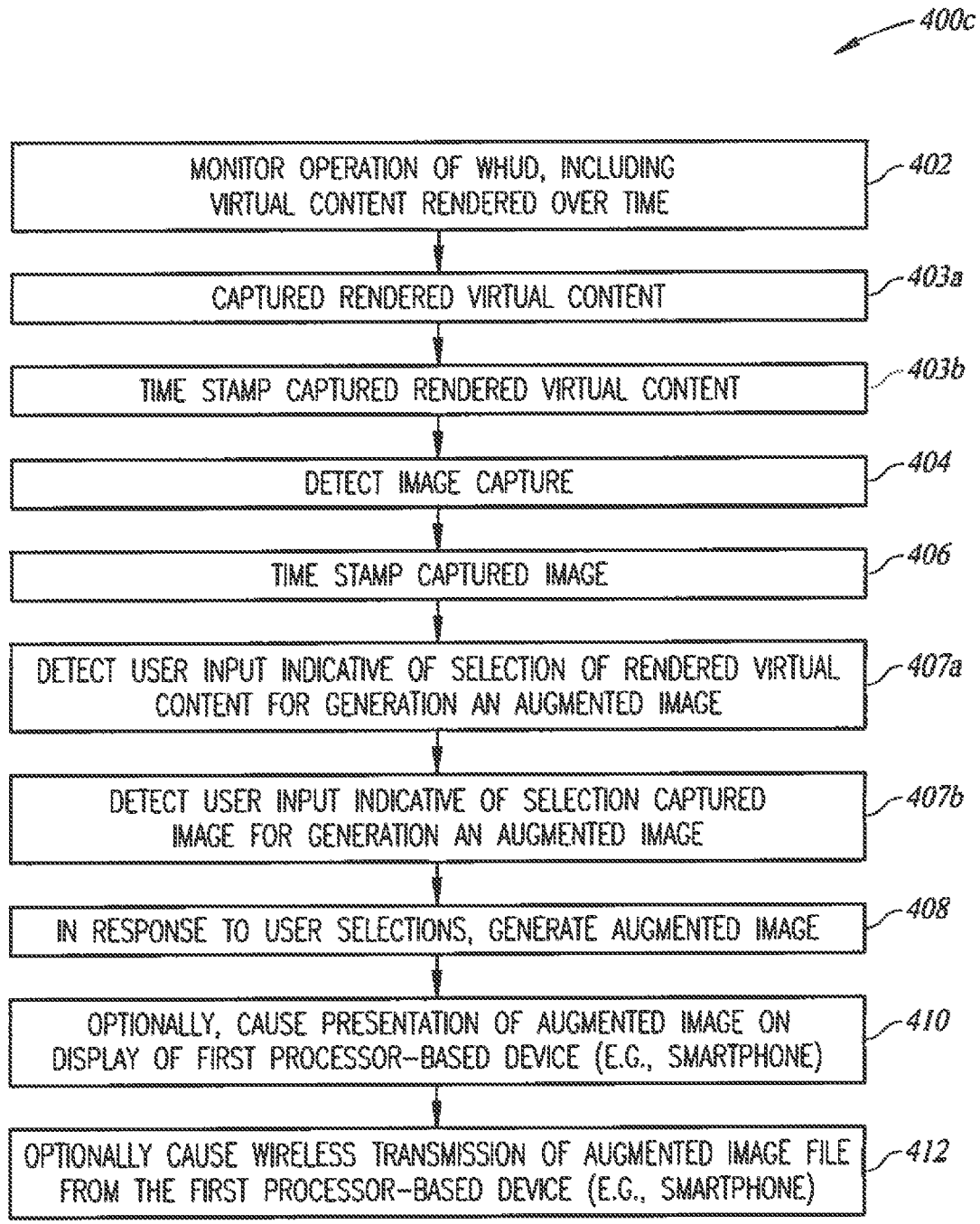
FIG. 4C is a flow diagram that shows an exemplary low level method of operation to produce augmented images in accordance with the present systems, devices, and methods.

FIG. 4C shows a low level method 400c of operation to produce augmented images in accordance with the present systems, devices, and methods. The method 400c may be performed via an application executing on a first processor-based device 123 (e.g., smartphone) that is distinct from, and communicatively coupled to, a WHUD 100. One skilled in the art will appreciate that method 400b may also be implemented on any hardware as appropriate for a given application. Method 400c includes acts 402, 404, 406, 407, 408, 410, and 412, but one skilled in the art will appreciate that in alternative implementations certain acts may be omitted and/or additional acts may be added. One skilled in the art will also appreciate that the illustrated order of the acts is shown for exemplary purposes only and may change in alternative implementations. Many of the acts of the method 400c are similar, or even identical, to the acts of the method 400b (FIG. 4B). Similar or even identical acts are identified using the same reference numbers in FIG. 4C as used in FIG. 4B.

At 402, an application 126 executing by at least one processor of the first processor-based device 123 monitors the operation of the WHUD 100, including the virtual content rendered by the WHUD 100 over time. This monitoring may be continuous, periodic or aperiodic, for example based on pushes by the WHUD 100 to the first processor-based device 123 or based on pulls by the first processor-based device 123 from WHUD 100.

At 403a, the application 126 captures the rendered virtual content, for example storing the rendered virtual content in memory, optionally with metadata identifying the rendered virtual content, for instance metadata that reflects a time, location, and/or subject matter of the rendered virtual content. At 403b, the application may time stamp the rendered virtual content, At 403b, the application 126 may time stamp the virtual content, or the processor of WHUD 100 may time stamp the virtual content. Alternatively, the application 126 may rely on time stamping performed at or by the wearable heads up display.

At 404, an application 126 executing by at least one processor 124 of the first processor-based device 123 detects an image being captured by an image sensor 127, e.g., a camera of the first processor-based device 123.

Optionally at 406, an application 126 executing by at least one processor 124 of the first processor-based device 123 time stamps the captured image. This may facilitate temporal registration with a respective one of a plurality of sets of virtual content successively rendered by the WHUD 100.

At 407a, an application 126 executing by at least one processor 124 of the first processor-based device 123 detects a user input indicative of selection of one of the sets of rendered virtual content. The application 126 may display representations of the rendered virtual content for selection, for instance in a list form. The application 126 may provide filters or keyword or other searching functionality (e.g., time, location, subject matter) to facilitate identification of the desired set of rendered virtual content. Such may, for example, be presented via a graphical user interface on the first processor-based device 123.

At 407b, an application 126 executing by at least one processor 124 of the first processor-based device 123 detects a user input indicative of selection of the captured image for generation of an augmented image. The application 126 may display representations of the captured image for selection, for instance in a list form. The application 126 may provide filters or keyword or other searching functionality (e.g., time, location, subject matter) to facilitate identification of the desired captured image. Such may, for example, be presented via a graphical user interface on the first processor-based device 123.

In some implementations, the application 126 may suggest one or a limited number of captured images to select from based on a match or matches between one or more pieces of metadata associated with the captured image and one or more pieces of metadata associated with a selected set of rendered virtual content, for example matches between one or more of time of capture, location of capture, and/or subject matter. Alternatively, in some implementations, the application 126 may suggest one or a limited number of sets of rendered virtual content to select from based on a match or matches between one or more pieces of metadata associated with the set(s) of rendered virtual content and one or more pieces of metadata associated with a selected one of the captured image, for example matches between one or more of time of capture, location of capture, and/or subject matter.

In contrast to the method 400a, in the method 400b a user may wait a relatively long time after an image is captured before deciding to have an augmented image generated. In fact, one, more or even many images may be captured between the capture of the image selected to be used to generate the augmented image and the actual selection of that image to generate the augmented image. Having the virtual content and the images time stamped is facilitates this later generation of the augmented image based on much earlier rendered virtual content and much earlier captured images.

At 408, in response to the user selection, an application 126 executing by at least one processor 124 of the first processor-based device 123 generates an augmented image that includes at least a portion of a first image as captured by the image sensor 127 of the first processor-based device 123 with at least a portion of the first set of virtual content populated into the at least a portion of the first image as captured by the image sensor 127 based on the selections. Optionally at 410, an application 126 executing by at least one processor 124 of the first processor-based device 123 causes a presentation of the augmented image on the display 130 of the first processor-based device 123 (e.g., smartphone).

Optionally at 412, an application 126 executing by at least one processor 124 of the first processor-based device 123 causes an augmented image file to be wirelessly transmitted from the first processor-based device (e.g., smartphone) via at least one radio 128 and associated antenna 129 of the first processor-based device 123. For example, the first processor-based device 123 may transmit the augmented image to the third processor-based device 140 (e.g., another WHUD, another smartphone, tablet computer, laptop or desktop computer) to share with another user. Such communications may occur directly or indirectly between the first processor-based device 123 and the third processor-based device 140, and may even occur via second processor-based device 132 (e.g., social media server). The augmented image file may, in at least some instances, be a printable image filed.

Figure 4D:
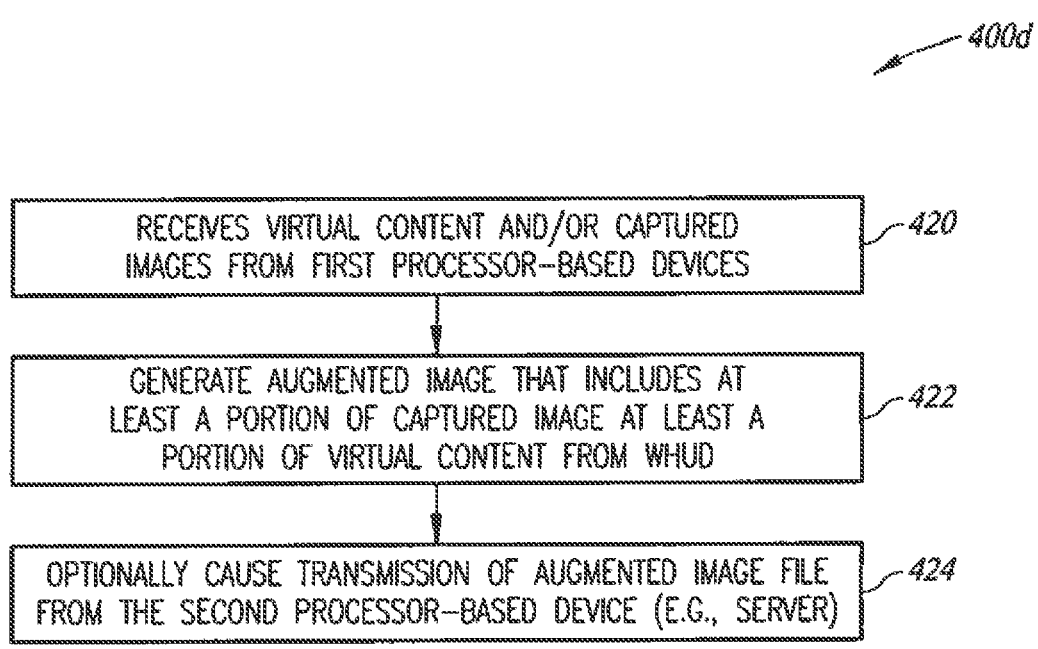
FIG. 4D is a flow diagram that shows an exemplary low level method of operation to produce augmented images in accordance with the present systems, devices, and methods.

FIG. 4D shows a low level method 400d of operation to produce augmented images in accordance with the present systems, devices, and methods. The method 400c may be performed via an application 138 executing on a second processor-based device 132 (e.g., backend computer system, server computer) that is distinct from, and communicatively coupled to one or more WHUDs 100 via respective first processor-based devices 123. One skilled in the art will appreciate that method 400c may also be implemented on any hardware as appropriate for a given application. Method 400d includes acts 420, 422, and 424, but one skilled in the art will appreciate that in alternative implementations certain acts may be omitted and/or additional acts may be added. One skilled in the art will also appreciate that the illustrated order of the acts is shown for exemplary purposes only and may change in alternative implementations.

At 420, an application 138 receives virtual content and/or captured images (e.g., in the form of image files) from various first processor-based devices 123. The virtual content may preferably be time stamped. The images may preferably be time stamped. Where receiving both virtual content and captured images, pairs of virtual content and the corresponding images should be logically associated with one another, for example via a common identifier or a data structure or data element (e.g., record/field, linked list).

At 422, an application 138 executing by at least one processor 134 of the second processor-based device 132 generates an augmented image that includes at least a portion of a first image as captured by the image sensor 127 of the first processor-based device 123 with at least a portion of the first set of virtual content populated into the at least a portion of the first image as captured by the image sensor 127. To generates an augmented image the at least one processor 134 of the second processor-based device 132 may perform registration (e.g., temporal registration, spatial registration). The at least one processor 134 of the second processor-based device 132 may perform image recognition, identifying features (e.g., landmarks, people, events) in the image and recognizing or assigning a unique identity or name to those identified features. Identifying and recognizing features in images can be computationally intensive, involving NP hard problems. The at least one processor 134 of the second processor-based device 132 may employ any of a variety of computational techniques to identify and recognize features in images, including machine learning involving artificial neural networks. Thus, offloading this function from the first processor-based device 123 to the second processor-based device 132 may be technical advantageous since the first processor-based device may take the form of a smartphone, and typically for the system to be commercially acceptable, the system would need to accommodate a very wide variety of smartphones with differing levels of computational abilities, at least some of which would likely not be up to the task.

Optionally at 424, an application 138 executing by at least one processor 134 of the second processor-based device 132 causes an augmented image file to be transmitted from the second processor-based device 132. For example, the second processor-based device 132 may transmit the augmented image to the first processor-based device 123 and/or to the third processor-based device 140 (e.g., another WHUD, another smartphone, tablet computer, laptop or desktop computer) to share with another user. In some implementations, the second processor-based device 132 may be set up as or function as a social media server. The augmented image file may, in at least some instances, be a printable image filed.

Figure 5A:
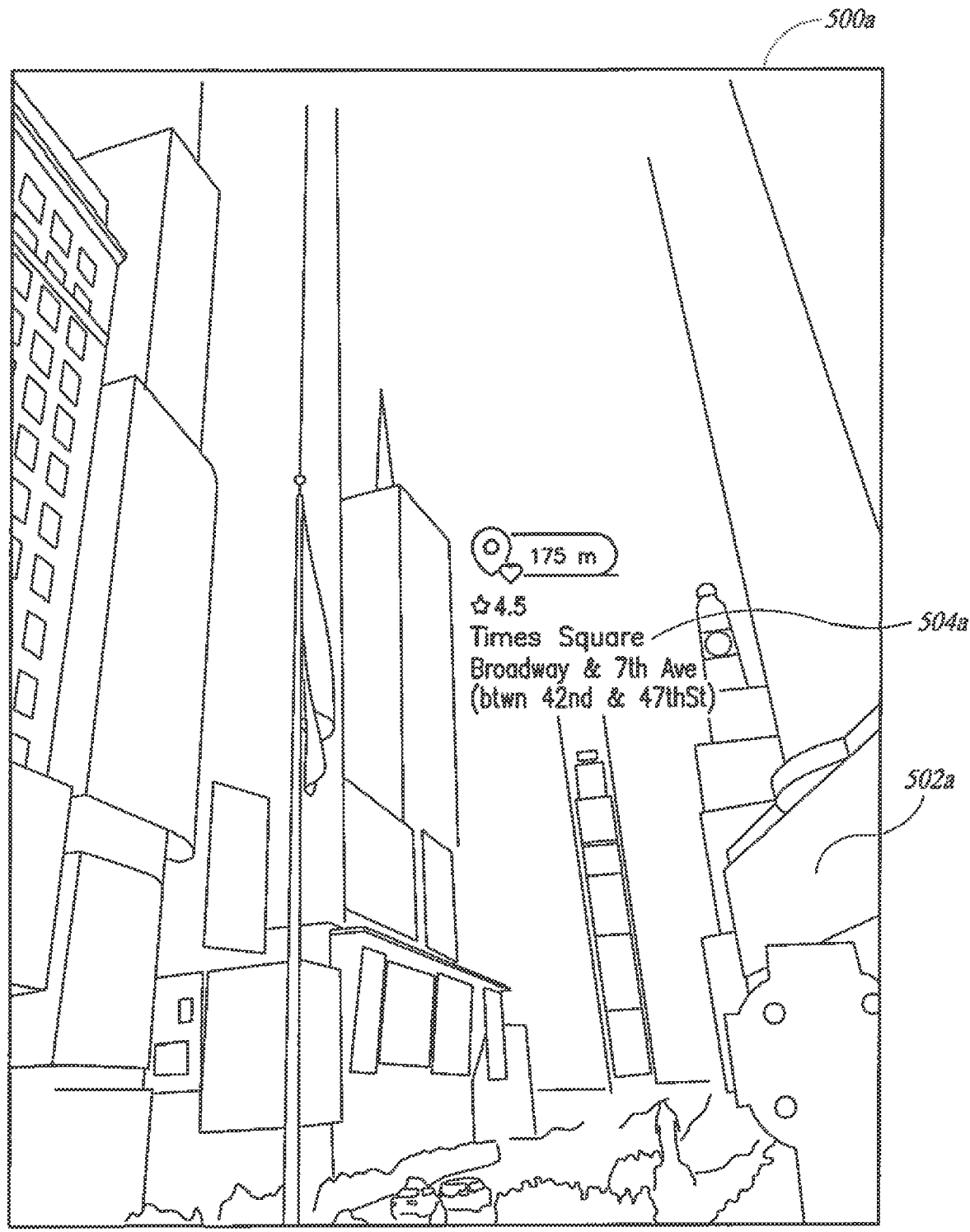
FIG. 5A is a screen print showing an augmented image comprising a captured image of a first scene with a set of virtual content populated therein in accordance with the present systems, devices, and methods.

FIG. 5A shows an augmented image 500a in accordance with the present systems, devices, and methods.

The augmented image 500a comprises an image of a first scene 502a for example Times Square in New York. The image may, for example, have been captured via an image sensor or camera on a smartphone. The augmented image 500a further comprises virtual content 504a that was rendered by a WHUD at, or proximate, the time the image was captured. The virtual content 504a can take a variety of forms. For example the virtual content 504a can be descriptive of the scene, a landmark, a person or an event. In this case, the virtual content 504a identifies the location by name and address, as well as providing the height of a building appear in the scene.

Figure 5B:
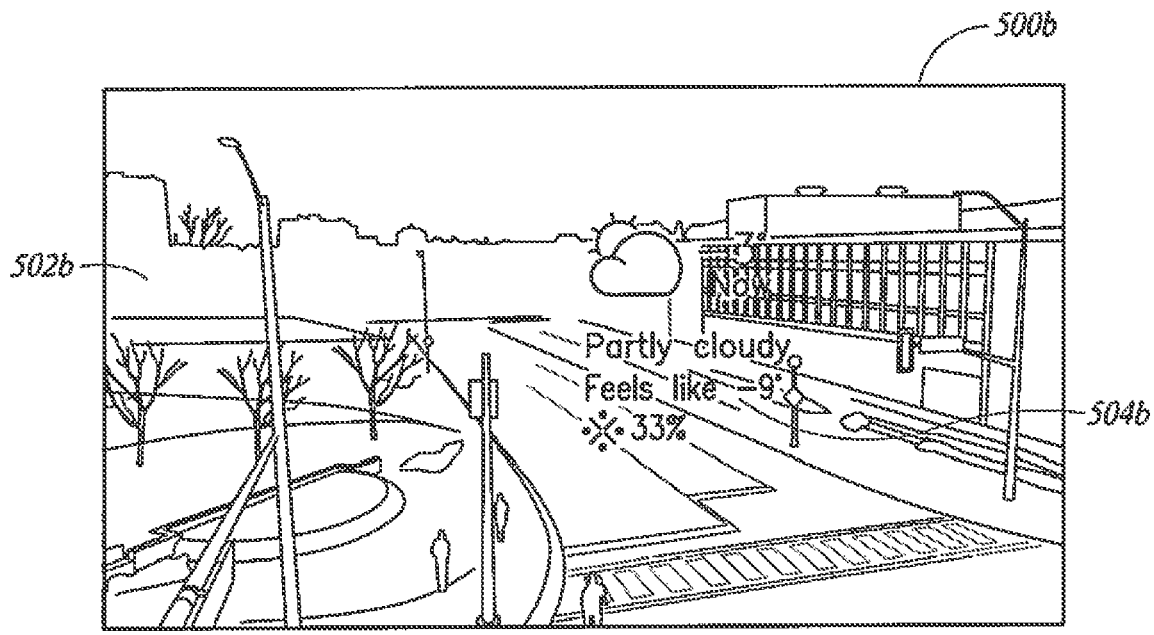
FIG. 5B is a screen print showing an augmented image comprising a captured image of a second scene with a set of virtual content populated therein in accordance with the present systems, devices, and methods.

FIG. 5B shows an augmented image 500b in accordance with the present systems, devices, and methods.

The augmented image 500b comprises an image of a second scene 502b for example downtown Kitchener, Ontario, Canada. The image may, for example, have been captured via an image sensor or camera on a smartphone. The augmented image 500b further comprises virtual content 504b that was rendered by a WHUD at, or proximate, the time the image was captured. The virtual content 504b can take a variety of forms. For example the virtual content 504b may not be descriptive of the scene, a landmark, a person or an event, but rather may be descriptive of conditions experienced on that day and time. In this case, the virtual content 504b specifies the weather conditions experienced at the location and at, or proximate, the time.

Figure 5C:
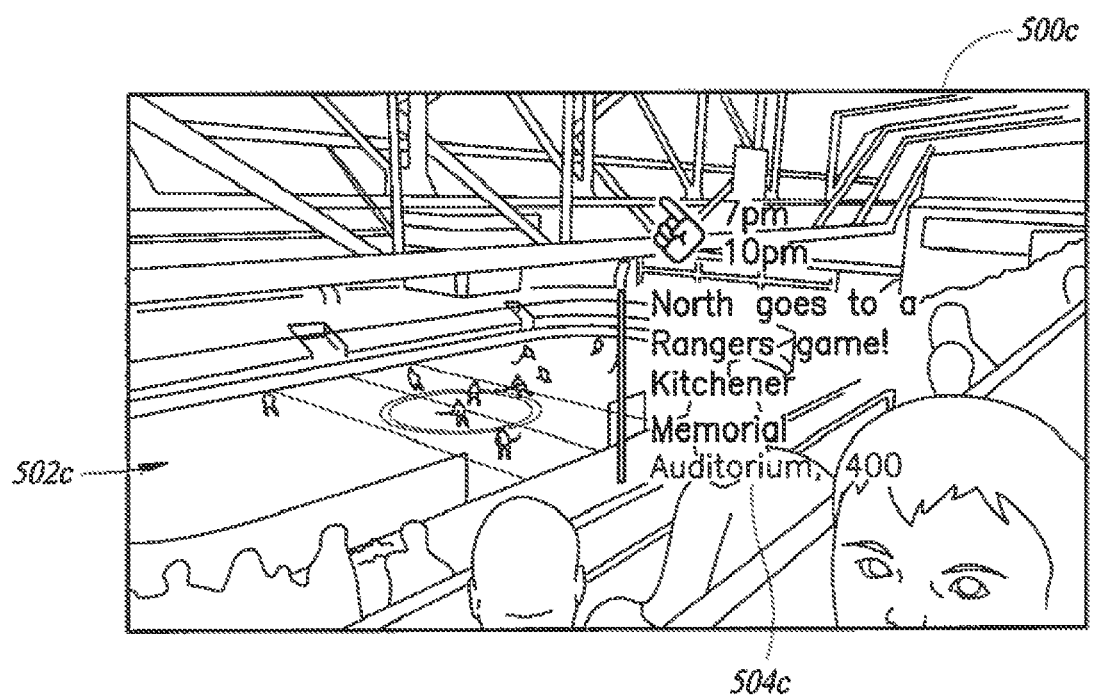
FIG. 5C is a screen print showing an augmented image comprising a captured image of a third scene with a set of virtual content populated therein in accordance with the present systems, devices, and methods.

FIG. 5C shows an augmented image 500c in accordance with the present systems, devices, and methods.

The augmented image 500c comprises an image of a third scene 502c for example an ice hockey rink. The image may, for example, have been captured via an image sensor or camera on a smartphone. The augmented image 500c further comprises virtual content 504c that may have been rendered by a WHUD at, or proximate, the time the image was captured, or may have been subsequently added, for example by the user. The virtual content 504c can take a variety of forms. For example the virtual content 504c may or may not be descriptive of the scene, a landmark, a person or an event. In this case, some of the virtual content 504c identifies the location, some of the virtual content species a time period, and some of the virtual content constitutes a customized message (e.g., "North goes to a Rangers game!").

In some implementations, one or more optical fiber(s) may be used to guide light signals along some of the paths illustrated herein.

The devices described herein may include one or more on-board power sources (e.g., one or more battery(ies)), a wireless transceiver for sending/receiving wireless communications, and/or a tethered connector port for coupling to a computer and/or charging the one or more on-board power source(s).

The devices described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, U.S. Non-Provisional patent application Ser. No. 14/155,087, U.S. Non-Provisional patent application Ser. No. 14/155,107, PCT Patent Application PCT/US2014/057029, and/or U.S. Non-Provisional patent application Ser. No. 15/282,535.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: U.S. Non-Provisional patent application Ser. No. 15/145,576, U.S. Non-Provisional patent application Ser. No. 15/167,458, U.S. Non-Provisional patent application Ser. No. 15/046,254, U.S. Pat. Nos. 9,299,248, 9,367,139, 9,389,694, U.S. Non-Provisional patent application Ser. No. 14/155,087, U.S. Non-Provisional patent application Ser. No. 14/155,107, PCT Patent Application PCT/US2014/057029, U.S. Non-Provisional patent application Ser. No. 15/282,535, U.S. Provisional Patent Application No. 62/577,081, U.S. Provisional Patent Application Ser. No. 62/714,489, U.S. Provisional Patent Application Ser. No. 62/607,816, U.S. Provisional Patent Application Ser. No. 62/607,819, U.S. Provisional Patent Application Ser. No. 62/671,248, U.S. Non-Provisional patent application Ser. No. 15/167,458, U.S. Non-Provisional patent application Ser. No. 15/827,667, and U.S. Provisional Patent Application Ser. No. 62/658,436, are each incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation in a processor-based system, the method comprising:
for a first set of virtual content rendered in a field-of-view of a wearable heads-up display to populate a scene, registering the first set of virtual content with a first image of at least a portion of the scene as captured by an image sensor; and
after the first set of virtual content has been registered with the first image, generating an augmented image that includes at least a portion of the first image as captured by the image sensor with at least a portion of the first set of virtual content populated into the at least a portion of the first image as captured by the image sensor.

2. The method of claim 1 wherein registering the first set of virtual content with a first image includes temporally registering the first set of virtual content with the first image.

3. The method of claim 1 wherein registering the first set of virtual content with a first image includes spatially registering the first set of virtual content in the first image.

4. The method of claim 3 wherein spatially registering the first set of virtual content in the first image includes performing image recognition via one or more processors to recognize features in the first image and identifying pieces of virtual content logically associated with the recognized features.

5. The method of claim 3 wherein generating an augmented image that includes at least a portion of the first image as captured by the image sensor with at least a portion of the first set of virtual content populated into the at least a portion of the first image as captured by the image sensor includes generating the augmented image with one or more pieces of the first set of virtual content populated at respective locations in the augmented image that match respective locations at which the first set of virtual content was rendered in the scene.

6. The method of claim 1, further comprising:
displaying the first set of virtual content by the wearable heads-up display; and
capturing the first image of at least a portion of the scene by an image sensor of the wearable heads-up display.

7. The method of claim 1, further comprising causing wireless transmission of the augmented image from the processor-based system.

8. The method of claim 1, further comprising:
displaying the first set of virtual content by the wearable heads-up display; and
capturing the first image of at least a portion of the scene by an image sensor of a first processor-based device that is distinct from the wearable heads-up display.

9. The method of claim 8, further comprising:
receiving the first set of virtual content by the first processor-based device that is distinct from the wearable heads-up display, wherein generating the augmented image is performed by one or more processors of the first processor-based device that is distinct from the wearable heads-up display.

10. The method of claim 8 wherein the first processor-based device is a smartphone having the image sensor, a display, and executing an application, and communicatively coupled to the wearable heads-up display via a local communications channel, and further comprising:
monitoring, by the application executing on the smartphone, virtual content rendered by the wearable heads-up display over time.

11. A processor-based system, comprising:
at least one processor;
at least one processor-readable storage medium communicatively coupled to the at least one processor and which stores processor-executable instructions which, when executed by the at least one processor, cause the at least one processor to:
for a first set of virtual content rendered in a field-of-view of a wearable heads-up display to populate a scene, register the first set of virtual content with a first image of at least a portion of the scene as captured by an image sensor based on the first set of virtual content being rendered in the field-of-view within a defined period of the first image being captured; and
after the first set of virtual content has been registered with the first image, generate an augmented image that includes at least a portion of the first image as captured by the image sensor with at least a portion of the first set of virtual content populated into the at least a portion of the first image as captured by the image sensor.

12. The processor-based system of claim 11 wherein to register the first set of virtual content with a first image the at least one processor temporally registers the first set of virtual content with the first image.

13. The processor-based system of claim 11 wherein to register the first set of virtual content with a first image the at least one processor spatially registers the first set of virtual content in the first image.

14. The processor-based system of claim 13 wherein to spatially register the first set of virtual content in the first image the at least one processor performs image recognition to recognize features in the first image and identifies pieces of virtual content logically associated with the recognized features.

15. The processor-based system of claim 13 wherein to generate an augmented image that includes at least a portion of the first image as captured by the image sensor with at least a portion of the first set of virtual content populated into the at least a portion of the first image as captured by the image sensor the at least one processor generates the augmented image with one or more pieces of the first set of virtual content populated at respective locations in the augmented image that match respective locations at which the first set of virtual content was rendered in the scene.

16. The processor-based system of claim 11, further comprising: the wearable heads-up display, wherein the wearable heads-up display includes the at least one processor, the at least one processor-readable storage medium, and at least one image sensor operable to capture the first image of at least a portion of the scene.

17. The processor-based system of claim 11, wherein the at least one processor-readable storage medium stores further processor-executable instructions which, when executed by the at least one processor, cause the at least one processor to cause wireless transmission of the augmented image from the processor-based system.

18. The processor-based system of claim 11, further comprising:
a first processor-based device that is distinct from the wearable heads-up display, wherein the first processor-based device includes the image sensor operable to capture the first image of at least a portion of the scene.

19. The processor-based system of claim 18 wherein one or more processors of the first processor-based device generate the augmented image.

20. The processor-based system of claim 18 wherein the first processor-based device is a smartphone having the image sensor, the at least one processor, the at least one processor-readable storage medium, and a display, and which executes an application and is communicatively coupled to the wearable heads-up display via a local communications channel, and wherein the application executing on the smartphone monitors virtual content rendered by the wearable heads-up display over time.

* * * * *